(12) United States Patent
Abendschoen (10) Patent No.: US 11,665,787 B2
(45) Date of Patent: May 30, 2023

(54) HEATING DEVICE AND METHOD FOR PRODUCING A HEATING DEVICE

(71) Applicant: E.G.O. Elektro-Geratebau GmbH, Oberderdingen (DE)

(72) Inventor: Robin Abendschoen, Eppingen (DE)

(73) Assignee: E.G.O. ELEKTRO-GERAETEBAU GMBH, Oberderdingen (DE)

( * ) Notice: Subject to any disclaimer, the term of this patent is extended or adjusted under 35 U.S.C. 154(b) by 132 days.

(21) Appl. No.: 17/246,037

(22) Filed: Apr. 30, 2021

(65) Prior Publication Data

US 2021/0259057 A1    Aug. 19, 2021

Related U.S. Application Data

(62) Division of application No. 16/120,896, filed on Sep. 4, 2018, now Pat. No. 11,032,877.

(30) Foreign Application Priority Data

Sep. 4, 2017    (DE) .................. 102017215417.9
Dec. 15, 2017    (DE) .................. 102017222958.6

(51) Int. Cl.
*B23P 15/26*    (2006.01)
*H05B 3/74*    (2006.01)

(52) U.S. Cl.
CPC ............. *H05B 3/748* (2013.01); *B23P 15/26* (2013.01)

(58) Field of Classification Search
CPC . H05B 3/748; H05B 3/10; H05B 3/64; H05B 3/06; H05B 2203/003;

(Continued)

(56) References Cited

U.S. PATENT DOCUMENTS

| 2,170,176 A | 8/1939 | Wiegand |
| 2,813,960 A | 11/1957 | Arthur et al. |
| 4,538,051 A | 8/1985 | Schreder et al. |
| 4,551,614 A | 11/1985 | Johnson |

(Continued)

FOREIGN PATENT DOCUMENTS

| CN | 1091581 A | 8/1994 |
| CN | 1643985 A | 7/2005 |

(Continued)

OTHER PUBLICATIONS

Extended European Search Report for European Application No. 18190886.4 dated Jan. 29, 2019.

(Continued)

*Primary Examiner* — Lee A Holly
(74) *Attorney, Agent, or Firm* — Alston & Bird LLP (57) ABSTRACT

A heating device in the form of a radiant heating device for a hob has a sheet-like support with a support top side, with at least one heating element on the support top side, which heating element is highly corrugated and runs in tracks in a laying pattern. The heating element has at least two heating conductor strips which each have lateral sides and a top edge and a bottom edge. These at least two heating conductor strips are placed together or placed on one another by way of their mutually facing lateral sides and are at least partially in contact. The at least two heating conductor strips are connected to one another in a fixed and non-detachable manner, advantageously before corrugation.

22 Claims, 2 Drawing Sheets

(58) Field of Classification Search
CPC ...... H05B 2203/017; H05B 1/00; H05B 7/14; B23P 15/26; F24C 7/062
See application file for complete search history.

(56) References Cited

U.S. PATENT DOCUMENTS

| | | | |
|---|---|---|---|
| 5,043,559 A * | 8/1991 | Scott | H05B 3/746 219/448.11 |
| 5,149,508 A | 9/1992 | Bullock | |
| 5,498,853 A * | 3/1996 | Gross | H05B 3/748 219/461.1 |
| 5,796,075 A | 8/1998 | Gross et al. | |
| 5,834,740 A | 11/1998 | Wilde et al. | |
| 5,892,205 A * | 4/1999 | Wilde | H05B 3/748 219/461.1 |
| 6,492,768 B1 | 12/2002 | Koizumi et al. | |
| 6,498,325 B1 | 12/2002 | Akel et al. | |
| 7,030,342 B2 | 4/2006 | McWilliams | |
| 7,417,207 B2 | 8/2008 | Wittenhagen et al. | |
| 7,989,012 B2 | 8/2011 | Gambino | |
| 8,618,448 B2 | 12/2013 | Alexander | |
| 8,779,338 B2 | 7/2014 | Jeanneteau et al. | |
| 11,032,877 B2 | 6/2021 | Abendschoen | |
| 2011/0248020 A1 | 10/2011 | Yuan | |
| 2019/0297676 A1 | 9/2019 | Ito et al. | |

FOREIGN PATENT DOCUMENTS

| | | |
|---|---|---|
| CN | 1741689 A | 3/2006 |
| CN | 101124851 A | 2/2008 |
| CN | 201028651 Y | 2/2008 |
| CN | 204231679 U | 3/2015 |
| CN | 106998957 A | 8/2017 |
| DE | 9313218 U1 | 10/1993 |
| DE | 4229375 A1 | 3/1994 |
| DE | 69016356 T2 | 5/1995 |
| DE | 19522798 A1 | 1/1997 |
| JP | 2003-303663 A | 10/2003 |
| KR | 10-2000-0005910 A | 1/2000 |
| WO | WO 99/09791 | 2/1999 |
| WO | WO 2009/014333 | 1/2009 |

OTHER PUBLICATIONS

United States Patent and Trademark Office, Notice of Allowance received for U.S. Appl. No. 16/120,896, dated Feb. 16, 2021, 7 pages.

United States Patent and Trademark Office, Office Action received for U.S. Appl. No. 16/120,896, dated Oct. 27, 2020, 8 pages.

German Patent and Trade Mark Office, Office Action received for Application No. 102017222958.6, dated May 18, 2022, 7 pages, Germany.

China National Intellectual Property Administration, First Office Action and Search Report received for Application No. 201811025166.3, dated Oct. 9, 2021, 11 pages, P.R.C.

Korean Intellectual Property Office, Office Action received for Application No. 10-2018-0104811, dated Dec. 28, 2022, 10 pages, South Korea.

* cited by examiner

HEATING DEVICE AND METHOD FOR PRODUCING A HEATING DEVICE

CROSS-REFERENCE TO RELATED APPLICATIONS

This application is a divisional of U.S. application Ser. No. 16/120,896, filed Sep. 4, 2018, which application further claims priority to German Application No. DE 102017215417.9, filed Sep. 4, 2017 and German Application No. DE 102017222958.6 filed Dec. 15, 2017; the contents of all of which as are hereby incorporated by reference herein in their entireties.

TECHNOLOGICAL FIELD

The invention relates to a heating device, in particular in the form of a radiant heating device for a hob, and also to a method for producing a heating device of this kind.

BACKGROUND

U.S. Pat. Nos. 5,834,740 A1 and 5,498,853 A1 disclose providing a radiant heating device for a hob having a sheet-like support which is composed of a thermally insulating and electrically insulating material, a heating element in strip form running in tracks in a laying pattern on the support top side of said support. In this case, the heating element comprises a heating conductor strip and is pushed to a slight extent into the support top side by way of a lower edge of the heating conductor strip in order to be held. Furthermore, the heating conductor strip has holding elements of integrated design which protrude downwards beyond the bottom edge by a length somewhat below the height of the heating conductor strip. These holding elements make a major contribution to fastening the heating conductor strip or the heating element on the support. The two lateral sides of the heating conductor strip emit heat at somewhat above 1000° C. during operation, this heat then radiating upwards.

Owing to an electrical resistance of the heating conductor strip or heating element, maximum heating outputs for a radiant heating device of this kind are currently limited to approximately 3600 W or 3700 W for domestic operation. Higher heating outputs cannot be achieved with this technology at present.

BRIEF SUMMARY

The invention is based on the problem of providing a heating device of the kind mentioned at the outset and also a method for producing a heating device of this kind, with which heating device and method prior art problems can be solved and it is possible, in particular, to generate a heating output which is higher than in the prior art and to design a heating device in a novel manner.

This problem is solved by a heating device having the features of claim 1 and also by a method for producing a heating device of this kind having the features of claim 23. Advantageous and preferred refinements of the invention can be found in the further claims and will be described in more detail below. In so doing, some of the features will be described only for the heating device or only for the method for producing the said heating device. However, irrespective of this, the intention is for the said features to be able to apply separately and independently of one another both to the heating device and also to the method for producing the said heating device. The wording of the claims is incorporated in the description by express reference.

It is provided that the heating device has a sheet-like support. This can advantageously be composed of thermally insulating and electrically insulating material, as is known per se from the prior art for radiant heating devices for hobs. This support has a support top side which is advantageously flat or planar. A heating element which runs in tracks in a specific laying pattern is provided on this support top side. This laying pattern can be of spiral and/or meandering design, as is also known per se from the prior art. In this case, the heating element advantageously mainly runs in parallel or virtually parallel or concentric tracks.

According to the invention, it is provided that the heating element has at least two heating conductor strips. Each of these heating conductor strips respectively has lateral sides and a top edge and a bottom edge. The at least two heating conductor strips are placed together or placed on one another or folded together by way of their mutually facing lateral sides, wherein the said heating conductor strips are at least partially in contact by way of the mutually facing lateral sides here. Under certain circumstances, the said heating conductor strips can even lie together in a sheet-like manner, at least at points or in sections, advantageously for the most part or by more than 70% or completely. The at least two heating conductor strips are connected to one another in a fixed and non-detachable manner, specifically at least in the state when they are arranged on or are fastened to the support, that is to say as the finished heating device. The at least two heating conductor strips of the heating element are advantageously fixedly connected to one another as early as before they are fastened to the support.

Owing to this, for all intents and purposes, doubling of the heating element with two heating conductor strips instead of with a single heating conductor strip in accordance with the prior art, the size of the conductor cross section can be increased and therefore the maximum possible current and therefore the heating output which is generated by the heating element also increase. Doubling-over or multiplying the heating conductor strip for the heating element has the major advantage over an integral and correspondingly thicker heating conductor strip, which would form the heating element as the single heating conductor strip, that it can be produced more easily, in particular if the heating element is corrugated or is intended to be corrugated. A corrugation operation can be performed with a wavelength of between 2 mm and 8 mm and/or with a wave amplitude of between 0.5 mm and 5 mm, as is known per se from the prior art. As a result, not only is the size of the emission area of the lateral sides of the heating element increased, but it is also possible to accommodate a heating conductor strip or a heating element with an inherently very large length for a specific value of the electrical resistance on the support with prespecified dimensions.

Within the scope of the invention, it has specifically been found that it is not a problem for operation of a heating device of this kind when the heating element which, for all intents and purposes, comprises a plurality of layers of heating conductor strips has points or regions at which these layers do not lie directly on one another or are not in contact. Furthermore, it is also true that contact of this kind between the individual heating conductor strips by way of their lateral sides does not affect the current flow. Firstly, a material can advantageously be selected from the prior art, which material oxidizes at its surface at least after several hours of operation at the operating temperature in such a way that it has a high contact resistance. In this way, regions of the lateral sides of the heating conductor strips which themselves lie against one another are electrically insulated from one another to all intents and purposes. Secondly, the respective heat emission from the individual heating conductor strips does not constitute a problem, as has been found in experiments. The ability to produce a corrugation for the heating conductor strip more effectively and also the possible use of previously customary thicknesses of heating conductor strips are clear advantages. It would primarily be expected that, given relatively narrow corrugations, problems with excessive bending could occur with a thick heating conductor strip and then cracks or at least weak points would be produced in the said heating conductor strip. This could then lead to damage and breakdowns during subsequent operation at high temperatures in the visibly glowing region together with the associated thermally induced expansions on account of frequent switching-on and switching-off operations.

In a refinement of the invention, the heating conductor strips can each advantageously extend over the full length of the heating element. A heating element then continuously from start to finish always consists of two or three or possibly even more heating conductor strips which are placed together or placed on one another by way of their lateral sides.

In a further refinement of the invention, it can be provided that a ratio of thickness of a heating conductor strip to its height, that is to say from the top edge to the bottom edge, lies between 1:20 and 1:500. It particularly advantageously lies between 1:60 and 1:200. In this case, a thickness of the heating conductor strip can lie in the range of from 0.03 mm to 0.1 mm, advantageously in the range of from 0.05 mm to 0.07 mm. A height can lie between 2 mm and 8 mm, advantageously between 3 mm and 5 mm.

The heating conductor strips are advantageously welded to one another, in particular by means of weld points. Weld points of this kind advantageously are at a distance along a longitudinal direction of the heating conductor strips from one another which can be, for example, two to twenty times the height of a heating conductor strip. As an alternative, the distance can lie between 5 mm and 100 mm, advantageously between 9 mm and 20 mm. Even if it is not absolutely necessary for the heating conductor strips to lie completely or largely close together or bear against one another over their length, this being the result of an increasing number of weld points and a resulting smaller distance, processing of the heating element, in particular for producing an above-mentioned corrugation, and also possible pushing of the heating element into the support top side is possible in a more effective manner, primarily when the layers of heating conductor strips bear tightly against one another.

A connection or welding of the heating conductor strips to one another is preferably arranged or performed below half the height of the heating conductor strip, that is to say more in a lower region of the heating element or the heating conductor strips. A connection or welding of this kind is advantageously provided below a quarter of the height of the heating conductor strip, particularly advantageously on a lower edge. The reason for this is that, owing to the heating element bearing against the support top side or owing to certain, even if slight, embedding in the support top side, firstly the heating element is directly cooled and secondly heat emission is reduced. Therefore, impairment of heat emission can have a less negative effect at these connecting points, in particular if welded. It is then possible, under certain circumstances, for the heating conductor strips to be at a distance from one another in the upwards direction or in the direction of their top edges, as a result of which the emission of the respective heating output is improved.

It is possible, in principle, for a heating element to comprise a plurality or large number of heating conductor strips which are placed on one another and are connected to one another, for example four heating conductor strips or more. The heating element is advantageously of two-layer or three-layer design with two heating conductor strips or three heating conductor strips on one another. The heating element is particularly advantageously of two-layer design with two heating conductor strips on one another.

In general, it can be provided that the heating conductor strips are of similar or identical design. This can apply to their contour and/or to their thickness. As a result, production can be simplified when only one single type of heating conductor has to be produced. In a modification to the invention, it can be provided that two heating conductor strips with the same contour and a different thickness are connected to form a heating element, wherein the difference in thickness can be between 5% and 100% of the thinner heating conductor strip.

As is known from the prior art, the heating conductor strips, as heating element, are advantageously held or arranged upright on the support top side. This is advantageously done at an angle of 90°, that is to say at a right angle in relation to the support top side. In this case, the top edge of the heating element or the heating conductor strips faces upwards and the respective bottom edge bears against the support or the support top side or is even embedded or pushed into the support top side or into the support to a certain extent. This is known per se from the prior art and provides particularly advantageous holding and arrangement of the heating element on the support. This is primarily advantageous in a multi-layer heating element of this kind comprising a plurality of heating conductor strips on one another.

In an advantageous refinement of the invention, the heating element has downwardly protruding holding elements which are pushed into the support top side in order to hold or to fasten the heating element on the support. These holding elements protrude beyond a line which runs by more than 80% of the length of the heating element along the bottom edge and parallel in relation to the top edge. In particular, the holding elements protrude beyond this line by between 30% and 200% of the height of the heating conductor strip here. This line can be the bottom edge of the heating conductor strips itself in one refinement of the invention. This is primarily the case when the holding elements are separate components which are placed over the top edge of the heating element from the top by way of two limbs in a U shape or bow shape, so that they protrude downwards beyond the bottom edge. The bottom edge then nevertheless continues to run in a straight line. In this case, the holding elements or the two limbs of the holding elements enclose all of the layers of heating conductor strips between them. This can already provide a kind of fixed connection of the heating conductor strips to one another and to the heating element. However, the holding elements are advantageously additionally fastened to the heating element by means of a weld connection or by turning the two limbs, which lie on one another, below the bottom edge. The holding elements are preferably fastened to the bottom edge in such a way that the two limbs, which protrude downwards beyond the bottom edge, are connected to one another and, at the same time, to the heating element or to the heating conductor strips in the lower region; they are all particularly preferably welded to one another here. In this case, it is sufficient for the main weld connection to be made between the two limbs of the holding elements, provided that, to all intents and purposes, a small portion of the weld connection is also cohesively connected to the bottom edges.

Therefore, the holding elements, by themselves and also by means of their connection to the heating element, can connect the heating conductor strips to one another, in addition to their function for holding the heating element on the support.

In an alternative refinement of the invention, the holding elements can be integrally provided on at least one heating conductor strip as downwardly protruding projections. Therefore, the said holding elements protrude beyond the abovementioned line which corresponds largely to the bottom edge, wherein this line is interrupted only by holding elements which protrude downwards from the bottom edge. The shape of these projections can be square or rectangular; they can advantageously also be trapezoidal with a certain taper in the downwards direction in order to make it easier to pierce or be pushed into the support top side.

When at least two heating conductor strips for the heating element which lie on one another and are connected to one another, advantageously by abovementioned weld points, are provided, each heating conductor strip can have holding elements. However, the respective holding elements of the respective heating conductor strips are then not arranged in an overlapping manner, so that the heating conductor strips lie on one another in a congruent manner, but rather are offset in relation to one another. In this case, the heating conductor strips are advantageously offset in relation to one another by the same distance as the holding elements in each case, so that one of the heating conductor strips is in each case alternately provided in the sequence of holding elements. It is considered to be sufficient for the holding effect when a holding element is, for all intents and purposes, pushed into the support top side only one layer deep. It may possibly even be the case that better holding is achieved in this way since no disadvantages can arise when a two-layer holding element is connected in a non-flat manner or is moved or changed due to temperature. Furthermore, fewer integrally formed holding elements can then be provided on the heating conductor strips, so that material can be saved for all intents and purposes. Holding elements which protrude integrally downwards have hardly any or no effect on the heating function in any case since only a small current flows through them during operation of the heating device.

Secondly, it can also advantageously be provided in holding elements of integrated design that they are connected to one another for the purpose of connecting the heating conductor strips to one another to form the heating element. The reason for this is also that, as has been explained above, no current or only a small current flows through these holding elements which protrude integrally downwards. Therefore, for all intents and purposes, damage to the structure and primarily to the surfaces of the heating conductor strips by a weld connection is sustained at a point which is subjected to loading by current flow and primarily by the generation of heat to a lesser extent, as a result of which the service life of the heating device can in turn be improved.

In order to be able to produce an above-described heating device, two steps are first carried out. Firstly, at least two heating conductor strips are placed on one another by way of their lateral sides in order to form a heating element. Furthermore, the heating element or the heating conductor strips are corrugated, specifically with deflections of a corrugation of this kind from its flat lateral sides. The order of these two steps can be arbitrary and can be interchanged. Therefore, the heating element can first be formed from at least two heating conductor strips which are connected to one another such that they lie on one another. In a subsequent step, the corrugation operation can be performed, so that the heating conductor strips which are connected to one another are corrugated to all intents and purposes. As an alternative, the individual heating conductor strips can be corrugated first, this of course being performed with an identical corrugation. In a subsequent step, the said heating conductor strips are then placed on one another and advantageously fixedly connected to one another.

If a corrugated multi-layer heating element is then produced, in a subsequent step the said heating element is applied to a support top side of a flat support in tracks in a specific laying pattern, as has already been mentioned in the introductory part, and fastened by being pushed in. In this case, a bottom edge of the heating element can be pushed into the support top side, as an alternative or additionally with downwardly protruding holding elements of the heating element. The heating element is advantageously applied to the support top side of the flat support in accordance with U.S. Pat. No. 5,834,740 A1 mentioned in the introductory part, that is to say by the entire heating element being introduced into a kind of special moulded mounting part with milled-out groove-like recesses. The heating element then protrudes beyond the top side of this moulded mounting part to a certain extent, so that the moulded mounting part, together with the heating element, is then placed and pushed onto the support top side. As a result, the heating element, in particular by way of the abovementioned protruding holding elements, is pushed into the support top side in order to be fastened.

In an advantageous refinement of the invention, the heating conductor strips are fixedly connected to one another to form the heating element in the method, so that the heating element is fastened to the support in a stable manner, in particular when it is thermally moved. The heating conductor strips are advantageously fixedly connected to one another before they are corrugated, so that corrugation is therefore performed in the multi-layer heating element. In this case, connection of the heating conductor strips to one another is also possible in a simpler and more exact manner in accordance with certain pre-specifications than when the heating conductor strips are first individually corrugated and then fixedly connected to one another.

In a likewise advantageous alternative refinement of the invention, the heating device has precisely two heating conductor strips which are designed in one part and integrally with one another. In this case, they are machined, for example punched, in particular out of a single strip, the intention within the scope of the invention however being that the said individual strip is composed of two heating conductor strips. The two heating conductor strips are then placed on one another by bending or folding along a bending line during production of the heating element or the heating device. This bending line runs, as explained above, parallel in relation to the longitudinal extent of the heating element and/or parallel in relation to the top edge. The two heating conductor strips are therefore only one heating conductor strip or are already integrally connected to one another for all intents and purposes, so that they no longer necessarily have to be connected to one another after the bending or folding operation. However, this can advantageously still be done, in particular after bending or folding along the bending line with placement on one another. Owing to a connection of this kind, the combined part can be permanently held even more effectively, advantageously by welding. In this case, the two heating conductor strips are first folded together in a first step, and the doubled-over heating element is then corrugated in a subsequent second step. To do so the other way round would be almost impossible owing to the integral design of the heating element.

As already explained above, in this refinement, the two heating conductor strips can also have holding elements which protrude from the bottom edge and are to be pushed into the support top side for the purpose of holding the heating element on the support, wherein these holding elements each advantageously protrude beyond the bottom edge to the same extent. Here, as described above, the holding elements are particularly advantageously integrally formed from the heating conductor strips or protrude from them, that is to say are not separate parts. The bending edge or bending line can run centrally between the two bottom edges of the two heating conductor strips, that is to say form a mirror axis for all intents and purposes, in the unfolded state. The bending edge or bending line advantageously runs through the end edges of the abovementioned holding elements, so that the two heating conductor strips are connected to one another in one part and integrally at the end edges or ends of the holding elements. Bending or folding is also more easily possible as a result. As an alternative, it would also be possible here to subsequently fasten separate holding elements to the doubled-over heating element, as explained above.

These and further features may be gathered from the claims and also from the description and the drawings, with the individual features being capable of being implemented in each case by themselves or severally in the form of sub-combinations in an embodiment of the invention and in other fields and being capable of constituting advantageous and independently patentable versions for which protection is claimed here. The subdivision of the application into individual sections and intermediate headings does not restrict the general validity of the statements made under these.

BRIEF DESCRIPTION OF THE SEVERAL VIEWS OF THE DRAWINGS

Exemplary embodiments of the invention are illustrated in the drawings and will be explained in more detail below. In the drawings.

DETAILED DESCRIPTION

Figure 1:
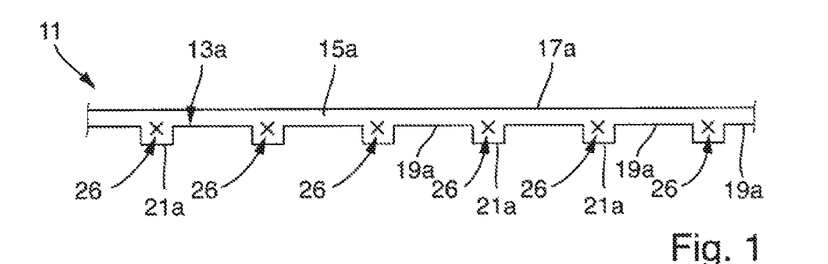
FIG. 1 shows a side view of a heating element according to the invention in the form of an elongate strip with holding elements which are integrally formed at the bottom.
Figure 2:
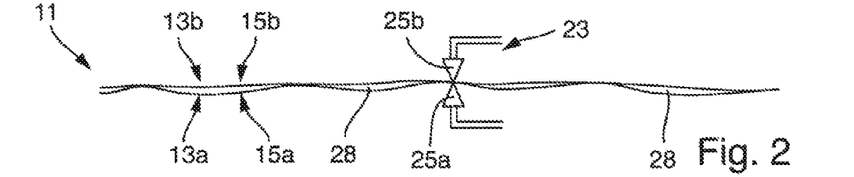
FIG. 2 shows a plan view, from above, of the heating element from FIG. 1 with a spot-welding device for connecting two heating conductor strips.
Figure 3:
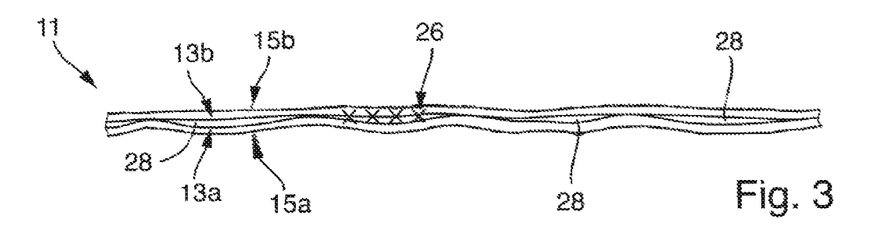
FIG. 3 shows an enlargement of the plan view of the heating element 11 from FIG. 2 with a welded portion and air gaps between the two heating conductor strips.

FIG. 1 shows a heating element 11 from the side, which heating element, as shown in FIGS. 2 and 3, comprises two heating conductor strips 13a and 13b. These heating conductor strips are areally placed on one another and run partially, but not completely, against one another. This is shown in the enlargement of the plan view, from above, according to FIG. 3 where separated narrow air gaps 28 can be seen between the heating conductor strips 13a and 13b. Welded portions 26, illustrated by crosses, hold the two heating conductor strips 13a and 13b together, as a result of which they are connected to one another in a fixed and non-detachable manner. The air gaps 28 shown in FIG. 3 can be very narrow and lie in the range of from 10% to 500% of the thickness of the heating conductor strips 13.

The heating conductor strip 13a has a lateral side 15a which is shown in FIG. 1, a top edge 17a which runs in a straight line, and a bottom edge 19a. The bottom edge 19a runs largely in a straight line, but is interrupted at the bottom by holding elements 21a which are integrally formed on the said bottom edge in a downwardly projecting manner. The height of the heating conductor strip 13a can be the few millimetres mentioned at the outset, the distance between the holding elements 21a in relation to one another can be approximately 15 mm to 25 mm. The second heating conductor strip 13b is designed in precisely the same way and also has the same thickness, as shown in FIG. 3.

As shown from above in FIG. 2, the heating conductor strips 13a and 13b are placed together or against one another in a flat manner and are connected by a spot-welding device 23 with two welding tips 25a and 25b by means of the spot-welded portions 26. In the exemplary embodiment of FIGS. 1 to 3, the spot-welded portions 26 are provided at a distance in relation to one another, so that they are each provided on the holding elements 21a. They lie substantially on the extrapolated line of the bottom edge 19a, but could also lie somewhat lower below this line, that is to say fully or only in the surface of the holding elements 21. The reasons for this have been explained above; in particular the structure of the mainly active part of the heating conductor strips 13 or of the heating element 11, which corresponds to the height of the heating conductor strips 13 between the top edge 17 and the bottom edge 19, is not negatively or adversely affected as a result.

Figures 4, 5:
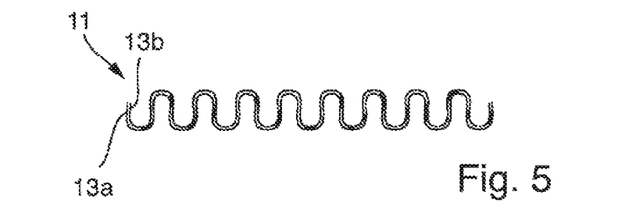
FIG. 4 shows an alternative heating element in an illustration similar to FIG. 1 comprising two heating conductor strips which bear against one another and of which the integrally formed holding elements are offset in relation to one another.
FIG. 5 shows a plan view of a completely corrugated heating element comprising two connected heating conductor strips which have been welded to one another before the corrugation operation.

An alternative refinement of a heating element 111 is shown in FIG. 4. The said figure once again also shows two heating conductor strips 113a and 113b which are placed together or placed on one another by way of their mutually facing lateral sides, so that they are largely in areal contact. The heating conductor strips 113a and 113b are each of identical design and substantially similar to the heating conductor strips 13a and 13b of the previous exemplary embodiment. Therefore, the said heating conductor strips have lateral sides 115; the lateral side 115a of the heating conductor strip 113a can be seen here. Furthermore, the said heating conductor strips have top edges 117a and 117b; the bottom edge 119a of the heating conductor strip 113a can also be seen. The two heating conductor strips 113a and 113b have holding elements 121a and 121b which are integrally formed in a downwardly projecting manner. However, the said holding elements are offset in relation to one another in such a way that they follow one another alternately and respectively are not overlapping or congruent, as is the case in the heating element 11 of FIGS. 1 to 3. The distance between the holding elements 121a and 121b in relation to one another is therefore twice as large. Nevertheless, secure fastening of the heating element 111 to a support by inserting the individual and only single-layer holding elements 121a and 121b is also possible in this case.

The two heating conductor strips 113a and 113b are in turn connected by welded portions 126 which are indicated by crosses. The distance between the welded portions 126 also corresponds to that in FIG. 1 except that the welded portions 126 cannot be made on the holding elements 121a and 121b with one another. Finally, these holding elements 121a and 121b do not bear against one another because they are offset in relation to one another. Therefore, the welded portions 126 are provided in the lower region of the heating conductor strips 113a and 113b, that is to say closer to the bottom edge 119 than to the top edge 117, specifically in each case precisely centrally between adjacent holding elements 121. According to a yet further refinement of the invention, the welded portions 126 could also be made such that they directly connect a bottom edge 119 of one heating conductor strip 113 to a holding element 121 of the other heating conductor strip 113.

The plan view of FIG. 5 of a heating element 11 shows the state after the corrugation operation, that is to say when the heating element 11 is completely corrugated. The heating element 11 which is produced in two layers as prescribed and comprises the two heating conductor strips 13a and 13b is passed through a corrugation device, as is currently already used in the prior art for producing corrugated heating elements which are known from the documents mentioned at the outset. The location of the holding elements 21 or the welded portions 26 in the course of the corrugation, that is to say whether at apex points or at turning points of the course of the corrugation, is not important for the finished heating element 11.

Figure 6:
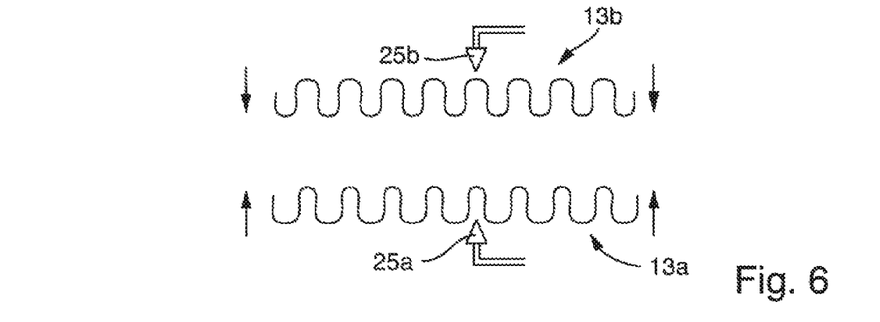
FIG. 6 shows an alternative design to FIG. 5 with two separately corrugated heating conductor strips which have first been placed together and then welded.

In an alternative method for producing a heating device or a heating element for a heating device, the individual heating conductor strips 13a and 13b are first corrugated in accordance with FIG. 6. In principle, the form of this corrugation can correspond to that of FIG. 5 and take place as is known in the prior art. The two heating conductor strips 13a and 13b are then placed on one another, advantageously in such a way that their holding elements, not illustrated here, either lie exactly on one another in accordance with FIG. 1 or are offset in relation to one another in accordance with FIG. 4. The welding operations are then performed in the above-described manner by means of the welding tips 25a and 25b in order to connect the two heating conductor strips 13a and 13b to one another in a fixed and non-detachable manner. The locations for the welding operations can be selected as described above.

In the method illustrated in FIG. 6, the still individual heating conductor strips 13 are therefore first corrugated and then placed together or placed on one another and then connected to one another in a fixed and non-detachable manner. This has the advantage that corrugation of the heating conductor strips is undoubtedly easier since it corresponds precisely to the procedure according to the prior art or in the manner in which it is currently carried out. However, one disadvantage is that it is rather difficult to carry out the subsequent welding operation, even with relatively thin welding tips. Finally, the said welding tips most appropriately have to perform a welding operation in each case at the crests of the waves, that is to say at the apex points, since the process of pressing the heating conductor strips together is possible in the simplest manner here. However, this is not always likely to be easy to carry out. Furthermore, it is not foreseeable that a welding operation will then always be able to be performed at the surfaces of the holding elements in accordance with FIG. 1 if this were to be desired.

Figure 7:
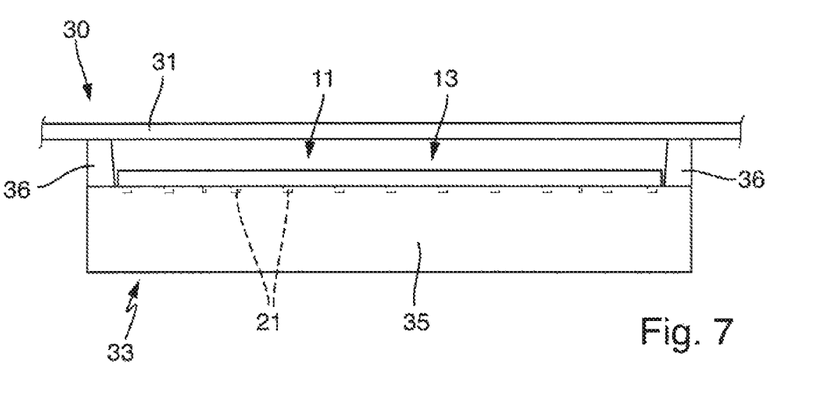
FIG. 7 shows a side view of a detail of a hob with a hob plate and a heating device arranged under it, which heating device has a partially embedded heating element on a support.

The simplified illustration of FIG. 7 shows a hob 30 with a hob plate 31 and a heating device 33 according to the invention beneath it. The heating device 33 is fitted to the bottom side of the hob plate 31, as is known in the prior art. The heating device 33 itself is in the form of a so-called radiant heating device and has a flat and sheet-like support 35 with a support edge 36 running around the outside. A heating element 11 is applied over a large portion of the surface of the support 35 within the support edge 36, specifically in a circumferential or meandering form, not illustrated here, as a laying pattern, possibly also concentrically. However, this can also be gathered from the prior art. Primarily, the process of pushing-in a heating element 11 in accordance with FIG. 5, which heating element therefore has two layers and is connected or welded over its length in a non-continuous manner, can advantageously be easily carried out. A double-layer heating element of this kind can also be inserted into press-in moulds known from the prior art in the form of the abovementioned document U.S. Pat. No. 5,834,740 A1; the pressing-in operation then being performed in the manner known from the prior art. The holding elements 21, illustrated using dotted lines in FIG. 7, are then pushed into the support 35, possibly also slightly into the bottom edge of the heating conductor strips.

By way of a heating device 33 of this kind in accordance with FIG. 7 together with a heating element 11 according to the invention which has two layers or three layers and is composed of heating conductor strips which are placed on one another and connected to one another in a non-detachable manner, a considerably higher heating output can be achieved given a production method which is ensured at the same time, is simple and can be easily carried out.

Figure 8:
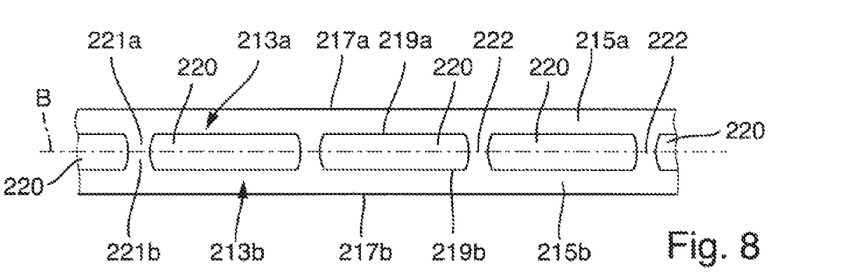
FIG. 8 shows a plan view of a single continuously integral strip which is symmetrical in relation to a centre axis for being folded together.

FIG. 8 shows, for a further refinement of the invention, how two heating conductor strips 213a and 213b are already produced in one part and integrally from the start. The two heating conductor strips 213a and 213b run with mirror-image symmetry in relation to a bending line B which is illustrated using a dashed-and-dotted line. In this case, recesses 220 in elongate form are punched out of a single originally continuous wide strip of appropriate heating conductor material, the said recesses, in respect of their longitudinal direction, in turn being symmetrical in relation to a bending line B.

Owing to these punched-out recesses 220, the heating conductor strips 213a and 213b are provided not only with the top edges 217a and 217b as outer edges of the formerly continuous wide strip, but rather also bottom edges 219a and 219b. Holding elements 221a and 221b protrude from and beyond these bottom edges 219a and 219b, wherein the two heating conductor strips merge with one another per se at the holding elements 221a and 221b. The recesses 220 therefore determine, by way of their shape, the shape of the holding elements 221a and 221b and also the height of the heating element in the finished state in accordance with FIG. 7.

Bending edges 222 are provided at the locations at which the bending line B runs through these holding elements or through opposite holding elements 221a and 221b, specifically along the said bending line B. These bending edges 222 can be designed, or for all intents and purposes prefabricated, as continuous bending edges by stamping or grooving. Therefore, the said bending edges can prespecify the location at which the two heating conductor strips are then bent along the bending line B and folded together. In a similar manner to in FIG. 1, the size of the distance between the holding elements 221a and 221b along the longitudinal direction of the heating conductor strips in the non-corrugated state is clearly shown here. It goes without saying that the holding elements could also be designed to be shorter or longer, narrower or wider, closer to one another or further away from one another.

Figure 9:
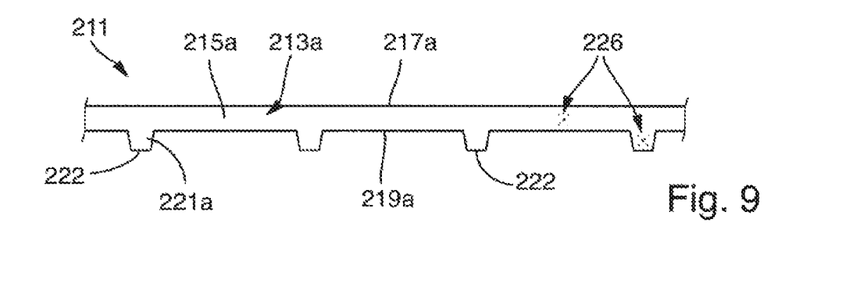
FIG. 9 shows the folded-together strip from FIG. 8 in two-layer form with downwardly protruding holding elements.

If the two heating conductor strips 213a and 213b have been folded together along the bending line B, wherein they exactly overlap, the structure of FIG. 9 is produced. This figure shows a heating element 211 from the side before the corrugation operation, once again in accordance with or in a similar manner to in FIG. 1. It can be seen here that, in FIG. 8, the lower heating conductor strip 213b has been folded along the bending line B into the plane of the drawing through 180° in order to then bear as flat as possible or in the plan view in accordance with FIGS. 2 and 3 against the other heating conductor strip 213a, in each case by way of the inner side. The two lateral sides 215a and 215b each then face outward, as is provided according to the invention. FIG. 9 also shows that the bottom edge of the holding elements 221a is formed by the bending edges 222. This closed bottom edge may possibly even make it easier to push the said holding elements into a support 35 similarly to in FIG. 7.

The right-hand side of FIG. 9 illustrates how two possible spot-welded portions 26 can be provided. The left-hand-side spot-welded portion 226 is located approximately at half the height of the heating conductor strip 213. However, the said spot-welded portion could also be provided higher or lower or anywhere between the top edge 217a and the bottom edge 217b, where possible directly against one of these edges. The right-hand-side option is a spot-welded portion 226 on a holding element 221a or approximately in the middle of the surface of this holding element. This welded portion 226 is then only at a very small distance from the lower bending edge 222, so that the holding effect against the heating element 211 bending upwards or the two heating conductor strips 213a and 213b bending away from one another is not very good. However, since the heating element 211 is still intended to be corrugated, in particular with a final form corresponding to the plan view of FIG. 5, bending upwards or bending away in this way is almost impossible or improbable. Therefore, the spot-welded portions 226 can also be dispensed with overall, this considerably reducing the expenditure on assembly and increasing the service life.

A major advantage in the exemplary embodiment of FIGS. 8 and 9 here is considered to be that, owing to the originally one-part and integral production of the two heating conductor strips in such a way that they are linked and are then bended or folded together, their position in relation to one another is prespecified and cannot be changed. Therefore, the position of the two heating conductor strips in the folded-together state in relation to one another is also exactly prespecified and cannot be changed. Furthermore, waste material from stamping operations can be reduced, and it is not absolutely necessary for spot-welding to be performed.

In principle, FIGS. 8 and 9 show that the two heating conductor strips do not necessarily have to have the same form and lie in a fully congruent manner on one another after being folded together or bent together. Other configurations are also feasible. However, the said method is highly recommended for reasons of uniform distribution of the heating output and, in particular, the surface heating output.

The invention claimed is:

1. A method for producing a radiant heating device, said method comprising:
   providing: (a) a flat support with a support top side, and (b) at least one heating element, the at least one heating element having at least two heating conductor strips that each have lateral sides, a top edge, and a bottom edge;
   placing the at least two heating conductor strips together or on one another by way of the lateral sides mutually facing each other, such that the lateral sides are at least partially but not completely in contact relative to one another;
   corrugating the at least one heating element with deflections of a corrugation out of the lateral sides of the at least two heating conductor strips; and
   after the placement and corrugation steps, applying the at least one heating element to the support top side of the flat support, the application being such that the at least one heating element runs in tracks in a laying pattern and is fastened by being pushed in the support top side,
   wherein the at least two heating conductor strips are fixedly connected to one another to form said heating element before they are corrugated.

2. The method according to claim 1, wherein:
   the at least two heating conductor strips are already integrally connected to one another before they are placed on one another,
   the at least two heating conductor strips are first folded onto one another in a first step, and
   the at least one heating element, in a doubled-over configuration, is then corrugated in a subsequent second step.

3. The method according to claim 2, wherein the at least two heating conductor strips are additionally connected to one another by means of welding after they have been folded onto one another.

4. The method according to claim 3, wherein the at least two heating conductor strips are welded to one another by welding points at a distance along a longitudinal direction of the at least two heating conductor strips from one another, the distance being two times to twenty times a height of one of the at least two heating conductor strips.

5. The method according to claim 2, wherein the at least two heating conductor strips are already connected to one another in one part and integrally and have already been produced in one part and integrally from one strip before they are placed on one another.

6. The method according to claim 1, wherein the at least two heating conductor strips are fixedly connected to one another to form said heating element after they have been corrugated such that the two separate heating conductor strips are first corrugated independently of each other and are then fixedly connected to one another to form said heating element.

7. The method according to claim 1, wherein:
   the at least two heating conductor strips comprise precisely two heating conductor strips designed in one part and integrally with one another; and the method comprising placing the two heating conductor strips on one another by bending or folding along a bending line, said bending line running parallel in relation to a longitudinal extent of said heating element or parallel in relation to said top edge.

8. The method according to claim 7, wherein:
the two heating conductor strips have holding elements protruding from the bottom edge thereof; and
the method comprises pushing the holding elements into the support top side for a purpose of holding the heating element on the support.

9. The method according to claim 8, wherein the holding elements each protrude beyond the bottom edge to the same extent.

10. The method according to claim 7, wherein the two heating conductor strips are machined out of a single strip.

11. The method according to claim 1, wherein:
the at least two heating conductor strips have holding elements protruding from the bottom edge thereof; and
the method comprises pushing the holding elements into the support top side for a purpose of holding the heating element on the support.

12. The method according to claim 11, wherein:
the holding elements protrude beyond a line which runs by more than 80% of a length along the bottom edge and parallel in relation to the top edge, and
the holding elements protrude beyond said line by between 30% and 200% of the height of the at least two heating conductor strips.

13. The method to claim 11, wherein:
the holding elements are separate components which are placed over the top edge of the heating element by way of two limbs in a U shape or bow shape and protrude downwards beyond the bottom edge, and
each of the holding elements encloses all the layers of the at least two heating conductor strips between them.

14. The method according to claim 11, wherein the at least two heating conductor strips are machined out of a single strip.

15. The method according to claim 1, wherein the at least two heating conductor strips are machined out of a single strip.

16. The method according to claim 1, wherein the at least two heating conductor strips are machined out of a single strip in separate form such that the two heating conductor strips are separate from each other.

17. The method according to claim 1, wherein the corrugation is performed with a wavelength of between 2 mm and 8 mm.

18. The method according to claim 1, wherein the corrugation is performed with a wave amplitude of between 0.5 mm and 5 mm.

19. The method according to claim 1, wherein, after placement, the at least two heating conductor strips are welded to one another.

20. The method according to claim 19, wherein the at least two heating conductor strips are welded to one another by welding points at a distance along a longitudinal direction of the at least two heating conductor strips from one another, the distance being two times to twenty times a height of one of the at least two heating conductor strips.

21. A method for producing a radiant heating device, said method comprising:
providing: (a) a flat support with a support top side, and (b) at least one heating element, the at least one heating element having at least two heating conductor strips that each have lateral sides, a top edge, and a bottom edge;
placing the at least two heating conductor strips together or on one another by way of the lateral sides mutually facing each other, such that the lateral sides are at least partially but not completely in contact relative to one another;
corrugating the at least one heating element with deflections of a corrugation out of the lateral sides of the at least two heating conductor strips; and
after the placement and corrugation steps, applying the at least one heating element to the support top side of the flat support, the application being such that the at least one heating element runs in tracks in a laying pattern and is fastened by being pushed in the support top side,
wherein, after placement, the at least two heating conductor strips are welded to one another by welding points at a distance along a longitudinal direction of the at least two heating conductor strips from one another, the distance being two times to twenty times a height of one of the at least two heating conductor strips.

22. A method for producing a radiant heating device, said method comprising:
providing: (a) a flat support with a support top side, and (b) at least one heating element, the at least one heating element having at least two heating conductor strips that each have lateral sides, a top edge, and a bottom edge;
placing the at least two heating conductor strips together or on one another by way of the lateral sides mutually facing each other, such that the lateral sides are at least partially but not completely in contact relative to one another;
corrugating the at least one heating element with deflections of a corrugation out of the lateral sides of the at least two heating conductor strips;
after the placement and corrugation steps, applying the at least one heating element to the support top side of the flat support, the application being such that the at least one heating element runs in tracks in a laying pattern and is fastened by being pushed in the support top side; and
pushing the holding elements into the support top side for a purpose of holding the heating element on the support,
wherein the at least two heating conductor strips have holding elements protruding from the bottom edge thereof beyond a line which runs by more than 80% of a length along the bottom edge and parallel in relation to the top edge, the holding elements protruding beyond said line by between 30% and 200% of the height of the at least heating conductor strips.

* * * * *